UNITED STATES PATENT OFFICE.

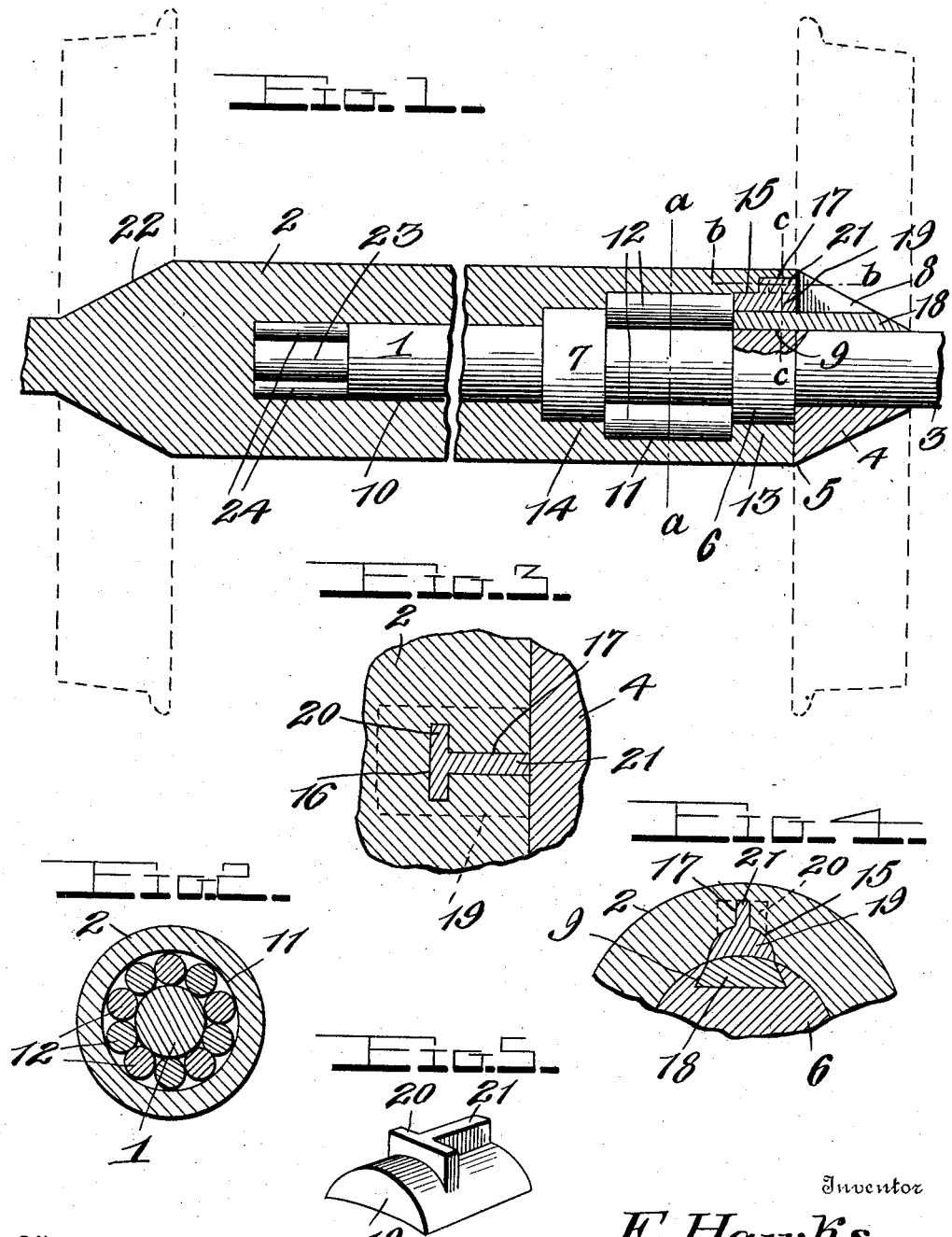

ERNEST HAWKS, OF WICHITA, KANSAS.

CAR-AXLE.

992,769.  Specification of Letters Patent.  Patented May 23, 1911.

Application filed December 24, 1910. Serial No. 599,063.

*To all whom it may concern:*

Be it known that I, ERNEST HAWKS, a citizen of the United States, residing at Wichita, in the county of Sedgwick and State of Kansas, have invented certain new and useful Improvements in Car-Axles, of which the following is a specification, reference being had to the accompanying drawings.
This invention relates to improvements in car axles to enable the wheels to revolve independently of each other and thereby reduce the power required to pull a train around a curve, the invention consisting in the construction, combination and arrangement of devices hereinafter described and claimed.

In the accompanying drawings: Figure 1 is a longitudinal sectional view of a car axle constructed in accordance with my invention, the spindle member of the axle being shown partly in elevation; Fig. 2 is a transverse sectional view of the same on the plane indicated by the line *a—a* of Fig. 1;
Fig. 3 is a detail sectional view on the plane indicated by the line *b—b* of Fig. 1; and Fig. 4 is a similar view on the plane indicated by the line *c—c* of Fig. 1. Fig. 5 is a detail perspective view.
My improved car axle comprises essentially a spindle member 1 and a sleeve member 2. The spindle member has the usual bearing portion 3 at its outer end for engagement with the usual car bearing and at the inner end of the said bearing portion is an outwardly tapered seat 4 to be fitted in a correspondingly shaped hole in the center of a car wheel, the said tapered seat forming a shoulder 5 at its inner end. The spindle member 1 is formed with an annular circumferential flange 6 against the shoulder 5 and with a similar flange 7 at a suitable distance from the flange 6. The tapered seat 4 of the spindle member is provided in one side with a groove 8 and a groove 9, which is co-incident with the groove 8 extends across the flange 6.

The sleeve member 2 of the axle has a bore 10 to receive the spindle member 1 and is also counterbored at 11 to provide an annular seat for the reception of a series of antifriction rollers 12 which are disposed between the flanges 6, 7 of the spindle member 1, the said rollers bearing between the wall or seat formed by the counterbore 11 and the bore 10 and being prevented from moving endwise by the flanges 6, 7. The said sleeve member 2 is also formed in its bore with annular shoulders 13, 14 which respectively engage the flanges 6, 7 of the spindle member 1.

The shoulder 13 of the sleeve member 2 is provided with a semi-cylindrical recess 15 the axis of which is parallel with that of the said sleeve member and of the spindle member and the said sleeve member is also provided with a transverse groove 16 which communicates with the said recess 15 and also with a longitudinal groove 17 which extends from one end of the said recess to the groove 16, the latter being about midway between the ends of the said recess.

The grooves 8 and 9 of the seat portion 4 and the flange 6 of the spindle member 1 co-act with the recess 15 to enable the anti-friction rollers to be placed in the counterbore 11 between the flanges 6 and 7. A plug 18 is provided for insertion in the grooves 8, 9, and a key-plug 19 is also provided which corresponds in size and shape with the recess 15, is adapted to be moved upwardly in the said recess after having been first inserted in the groove 9, through the groove 8, and is provided on its outer side with a transverse key-flange 20 for engagement with the groove 16 and a longitudinal flange 21 for engagement with the groove 17, it being understood that when the key-plug is thus in the recess 15 with its flanges 20 and 21 respectively engaged with the grooves 16, 17, the plug 18 may be then inserted under the key-plug so as to hold the latter in place, the roller 12 co-acting with the flanges 6, 7 to effectually lock the members 1, 2 of the axle together and the plug serving to prevent any of the rollers 12 from getting out of place and hence while the members of the axle are connected together for rotation one upon or with reference to the other, endwise movement and disengagement of the said axle members is effectually prevented. The sleeve member 2 has a tapered seat 22, corresponding with the seat 4, for the other wheel and the spindle member 1 may also be provided, as here shown, at its inner end, with a reduced portion 23, whereby an annular space is formed around the said reduced portion, of the sleeve member, for the reception of another set of antifriction rollers 24. Before the rollers 12 and 24 are mounted in the axle the parts of the axle in which the said rollers are disposed should preferably be provided with a suitable lubricant. It will be understood that the wheels will be firmly secured on the seats 4, 22 of the axle members and that the axle members, being independently revoluble, will permit independent rotation of the car wheels and hence greatly facilitate the passage of a train around a curve.

Having thus described the invention what is claimed is:

1. A car axle comprising a spindle member, a sleeve member mounted for rotation thereon, said spindle member having annular flanges spaced apart and said sleeve member having an enlarged counterbore between said flanges, and anti-friction rollers between the said flanges and bearing between the spindle member and the counterbore of the sleeve member.

2. A car axle comprising a spindle member, a sleeve member mounted for rotation thereon, said spindle member having annular flanges spaced apart and said sleeve member having an enlarged counterbore between said flanges, anti-friction rollers between the said flanges and bearing between the spindle member and counterbore of the sleeve member, and means to prevent the casual endwise movement of said anti-friction rollers.

3. A car axle comprising a spindle member, a sleeve member mounted for rotation thereon, said spindle member having annular flanges spaced apart and said sleeve member having an enlarged counterbore between said flanges, anti-friction rollers between the said flanges and bearing between the spindle member and the counterbore of the sleeve member, the said spindle member having a groove extending across the outer flange thereof and leading to the said counterbore, the said sleeve member being provided, in a portion thereof opposite said flange with a recess and a key-groove communicating with said recess, in combination with a key-plug to fit in said recess and having a key-flange for engagement with said key-groove, and a plug in the said groove of the said outer flange to hold the said key-plug in place.

In testimony whereof I hereunto affix my signature in the presence of two witnesses.

ERNEST HAWKS.

Witnesses:
EARL E. RUHL,
O. L. JACQUES.

---

Copies of this patent may be obtained for five cents each, by addressing the "Commissioner of Patents, Washington, D. C."